Figure 1:
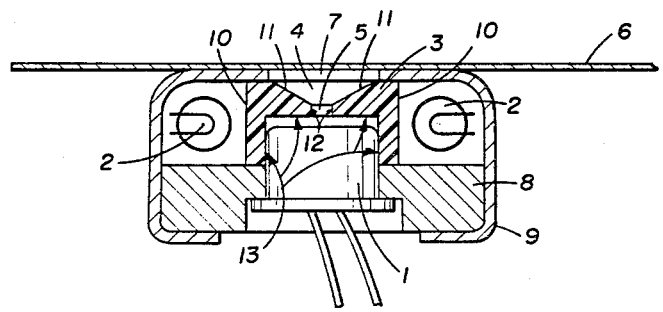

Aug. 6, 1968    R. J. BLACKMAN    3,396,281
REFLECTIVE PHOTOELECTRIC PICKUPS
Filed Aug. 12, 1965

ROBERT J. BLACKMAN
INVENTOR.

United States Patent Office 3,396,281
Patented Aug. 6, 1968

3,396,281
REFLECTIVE PHOTOELECTRIC PICKUPS
Robert J. Blackman, Rochester, N.Y., assignor to Eastman Kodak Company, Rochester, N.Y., a corporation of New Jersey
Filed Aug. 12, 1965, Ser. No. 479,178
9 Claims. (Cl. 250—239)

This invention relates to improvements in photoelectric pickups. More specifically, it relates to photoelectric pickups designed to sense light originating in the pickup and reflected off a surface, and then to actuate a sorting, cutting or similar implement in accordance with markings on the surface.

Prior photoelectric pickups of the above type commonly illuminate a surface to be sensed by focusing light with a lens or mirror onto the surface and then sensing the reflected light by a photocell through another or the same lens. An attempt to eliminate either lens in such devices has generally reduced the sensitivity of the system.

It is an object of this invention to provide a low cost photoelectric pickup without the need for a lens either for illumination or for sensing such illumination, but with substantially improved sensitivity.

The above objects are accomplished by the interposition of a light transmitting block between the sensing area, the light source and the photocell. The block has a two part opening facing the area to be sensed which performs the dual function of increasing the uniformity of illumination on the sensed surface and defining an aperture for the photocell. The opening has a top resembling a countersink whose sides are frosted to diffuse illumination from the light source. It has a bottom with opaque sides to define an aperture for the photocell. It is so shaped that light passes freely from the sensed surface to the photocell but is restricted from passing from the frosted surfaces to the photocell. This low cost light transmitting block replaces two lens systems so well that it gives actually higher sensitivity than prior pickups using lenses.

Figure 2:
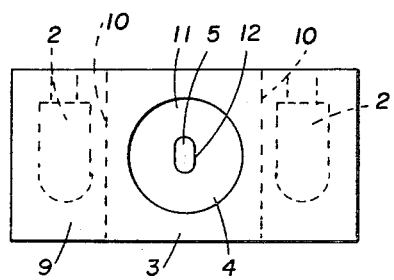

In the drawings:

FIG. 1 is a front cross-sectional view of a photoelectric pickup constructed according to the invention; and
FIG. 2 is a top view of the photoelectric pickup shown in FIG. 1.

According to FIGS. 1 and 2, a photoelectric pickup containing a photocell 1, light sources 2, and a transparent block 3 are enclosed in a casing 9 along with a support 8. The casing contains an opening 7 across which is moved a surface to be sensed 6. The transparent block has an opening of which the top 4 is cone-shaped and is positioned adjacent to said opening 7 in the casing. The surface 11 of said block which faces the inside of opening 4 is frosted to aid in the even distribution of illumination from the light sources to the surface to be sensed. The surfaces 10 of said block adjacent to the light sources may also be frosted. The opening in the block has a bottom part 5 which is generally oblong in cross-section and defines an aperture for the photocell. The surface 12 of the block on the inside of this oblong opening is opaque to prevent radiation from reaching the photocell directly from the light sources or the frosted surfaces. Other surfaces 13 facing the photocell should also be made opaque, or the light otherwise blocked.

Thus, light from the light sources 2 is diffused by surfaces 10 and 11 thereby evenly illuminating the sensed surface 6. Light from the sensed surface 6 is in turn sensed by the photocell through the aperture 5. The configuration of the large opening formed by smaller openings 4 and 5 thus effectively places both the photocell and the light sources very close to the sensed area and at the same time prevents light from striking the photocell except when reflected off the sensed area. A transparent block so shaped then provides a very low cost method of increasing the sensitivity of a photoelectric pickup.

FIGS. 1 and 2 show cone-shaped and oblong openings in the block. These are preferred for use with a photocell of long thin sensitive area. Other cross sectional designs may be better suited for other sensitive areas.

The vertical shape of the opening may also vary providing it is of such shape that a radiation diffusing and transmitting surface is placed near the sensed surface but direct radiation from such radiation diffusing surface is restricted from passing to the photocell. More specifically, the portion of the sides which is frosted and the portion which is opaque should be constructed to form a corner convex to the inside of the opening.

The principle of this invention can work with any number of light sources. With four light sources, for example, the block itself is made square in shape and the surfaces 10 adjoining the light sources are four in number.

Although the terms light, light source and photocell are sometimes used in describing the invention, it should be understood that the radiation used need not be of a wavelength visible by the human eye in order to be effective in practice of the invention.

The invention has been described in detail with particular reference to certain preferred embodiments thereof, but it will be understood that variations and modifications can be effected within the spirit and scope of the invention as described hereinbefore and as defined in the appended claims.

I claim:
1. In a photoelectric pickup for sensing the radiation reflecting characteristics of a sensed surface having
   (a) a radiation source positioned so that some of its radiation is reflected off said sensed surface, and
   (b) a photocell positioned to receive such reflected radiation
the improvement comprising a radiation transmitting block having
   (1) at least one radiation transmitting and diffusing surface interpositioned between said radiation source and said sensed surface, and
   (2) an aperture defining means positioned to allow passage of said reflected radiation to said photocell while restricting passage of radiation directly from said diffusing surface to said photocell.
2. The improvement according to claim 1 wherein said block is adapted for use with a plurality of radiation sources and has a plurality of radiation transmitting and diffusing surfaces interpositioned between each of said radiation sources and said sensed surface.
3. The improvement according to claim 1 wherein said aperture defining means is an opening in said block with opaque side surfaces.
4. For use as a part of a reflective type photoelectric pickup having a radiation source and a photocell responsive to radiation from said source, a device for increasing the sensitivity of said pickup comprising a block of radation transmitting material having an aperture defining means and at least one light diffusing and transmitting surface, said block being so shaped that when inserted between said photocell and said light source, said aperture defining means allows passage of light from a sensed surface to said photocell and said light diffusing surface disperses light passing from said light source to said sensed surface.
5. A device for increasing the sensitivity of a photoelectric pickup comprising, a block of light transmitting material having an opening therein through which light may pass, one end of said opening being larger than the other end and at least part of the surface of said block on the inside of said opening being light diffusing and transmitting.

6. A device according to claim 5 wherein the portion of the surface of said opening nearest the wide end of said opening is light diffusing and transmitting and the remaining portion of the surface of said opening is non-light transmitting.

7. A device according to claim 6 wherein said diffusing portion and said non-light transmitting portions of said surface intersect forming a corner convex to the inside of said opening.

8. A block according to claim 7 wherein said device has at least two outer light diffusing and transmitting surfaces.

9. A photoelectric pickup comprising in combination a plurality of light sources, a photoelectric cell, an area for viewing a surface to be sensed, a block of light transmitting material having an opening therein through which light may pass, one end of said opening being wider than the other end, the part of the surface of said block nearest the wide end of said opening on the inside of said opening being light diffusing and transmitting and the remaining part of said surface being non-light transmitting, said two parts of said surface intersecting and forming a corner which is convex to the inside of the opening, said block being so positioned that it allows passage of light from said light sources through the diffusing surface to the sensed surface and from the sensed surface to the photocell, but restricts light from passing directly from said light source or said diffusing surface to the photocell.

References Cited

UNITED STATES PATENTS

| | | | |
|---|---|---|---|
| 2,164,513 | 7/1939 | Gaebel | 88—14 |
| 2,358,020 | 9/1944 | Miller | 88—14 |
| 2,920,209 | 1/1960 | Asten | 250—239 |
| 3,041,462 | 6/1962 | Ogle | 250—239 X |

JAMES W. LAWRENCE, *Primary Examiner.*

V. LAFRANCHI, *Assistant Examiner.*

UNITED STATES PATENT OFFICE
CERTIFICATE OF CORRECTION

Patent No. 3,396,281                                              August 6, 1968

Robert J. Blackman

It is certified that error appears in the above identified patent and that said Letters Patent are hereby corrected as shown below:

Column 3, line 15, "block" should read -- device --; same line 15, "device" should read -- block --.

Signed and sealed this 17th day of March 1970.

(SEAL)
Attest:

Edward M. Fletcher, Jr.                                WILLIAM E. SCHUYLER, JR.
Attesting Officer                                              Commissioner of Patents